(12) United States Patent
Van Den Braber et al.

(10) Patent No.: US 9,476,908 B2
(45) Date of Patent: Oct. 25, 2016

(54) HIGH THROUGHPUT MICROSCOPY DEVICE

(71) Applicant: Nederlandse Organisatie voor toegepast-natuurwetenschappelijk onderzoek TNO, Delft (NL)

(72) Inventors: Rens Van Den Braber, Delft (NL); Teunis Cornelis Van Den Dool, Delft (NL); Hamed Sadeghian Marnani, Delft (NL); Niek Rijnveld, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 0 days.

(21) Appl. No.: 14/410,588

(22) PCT Filed: Jun. 27, 2013

(86) PCT No.: PCT/NL2013/050459
§ 371 (c)(1),
(2) Date: Dec. 23, 2014

(87) PCT Pub. No.: WO2014/003557
PCT Pub. Date: Jan. 3, 2014

(65) Prior Publication Data
US 2015/0323561 A1    Nov. 12, 2015

(30) Foreign Application Priority Data

Jun. 28, 2012  (EP) .................... 12174204
Jul. 6, 2012   (EP) .................... 12175445

(51) Int. Cl.
*G01Q 20/00* (2010.01)
*G01Q 10/06* (2010.01)
*G01Q 70/06* (2010.01)

(52) U.S. Cl.
CPC ............ *G01Q 20/00* (2013.01); *G01Q 10/06* (2013.01); *G01Q 70/06* (2013.01)

(58) Field of Classification Search
None
See application file for complete search history.

(56) References Cited

U.S. PATENT DOCUMENTS

2007/0089496 A1*  4/2007  Degertekin ............ B82Y 35/00
                                                   73/104
2007/0103697 A1*  5/2007  Degertekin ............ B82Y 35/00
                                                   356/501

(Continued)

FOREIGN PATENT DOCUMENTS

JP   2005300177 A    10/2005
WO   2007/121208 A2  10/2007

OTHER PUBLICATIONS

PCT/NL2013/050459—International Search Report—dated Aug. 8, 2013.

(Continued)

*Primary Examiner* — Michael Logie
(74) *Attorney, Agent, or Firm* — Banner & Witcoff, Ltd.

(57) ABSTRACT

An object is mounted on a surface of a sample carrier. Properties of the surface of the object are measured and/or modified by means of a plurality of independently movable heads, each comprising a microscopic probe. The heads being located between the surface of a reference grid plate and the surface of the sample carrier. Head specific target locations are selected for the heads. Each head is moved over the surface of the reference grid plate, to the target location of the head. During movement a position of the head is determined from markings on the reference grid plate sensed by sensor in the head. When the sensor has indicated that the head is at the target location selected for the head a force between the head and the reference grid plate is switched to seat and/or clamp the head on the reference grid plate.

20 Claims, 7 Drawing Sheets

(56) References Cited

U.S. PATENT DOCUMENTS

| | | | | |
|---|---|---|---|---|
| 2007/0234786 A1* | 10/2007 | Moon | ................... | B82Y 10/00 73/105 |
| 2008/0094593 A1* | 4/2008 | Shibazaki | ........... | G03F 7/70725 355/53 |
| 2008/0121813 A1* | 5/2008 | Young | ................... | B82Y 35/00 250/442.11 |
| 2008/0209988 A1* | 9/2008 | Degertekin | ............ | B82Y 35/00 73/105 |
| 2011/0170108 A1* | 7/2011 | Degertekin | ............ | B82Y 35/00 356/454 |
| 2013/0205455 A1* | 8/2013 | Dell | ...................... | B82Y 35/00 850/33 |
| 2014/0147337 A1* | 5/2014 | Urey | ................... | G01N 29/022 422/69 |
| 2015/0185248 A1* | 7/2015 | Sadeghian Marnani | ................ | B82Y 35/00 850/3 |

OTHER PUBLICATIONS

PCT/NL2013/050459—Written Opinion—dated Aug. 8, 2013.

* cited by examiner

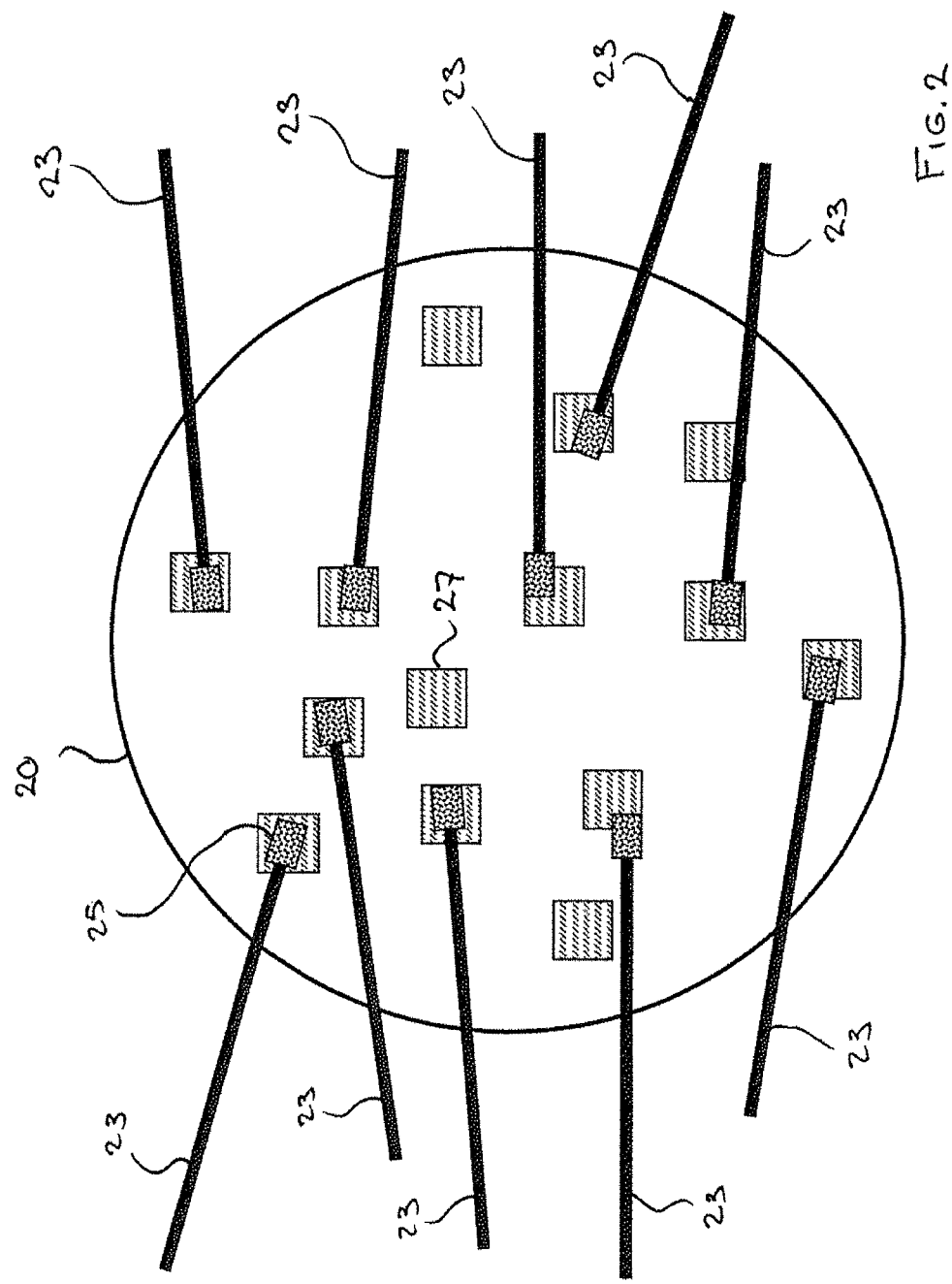

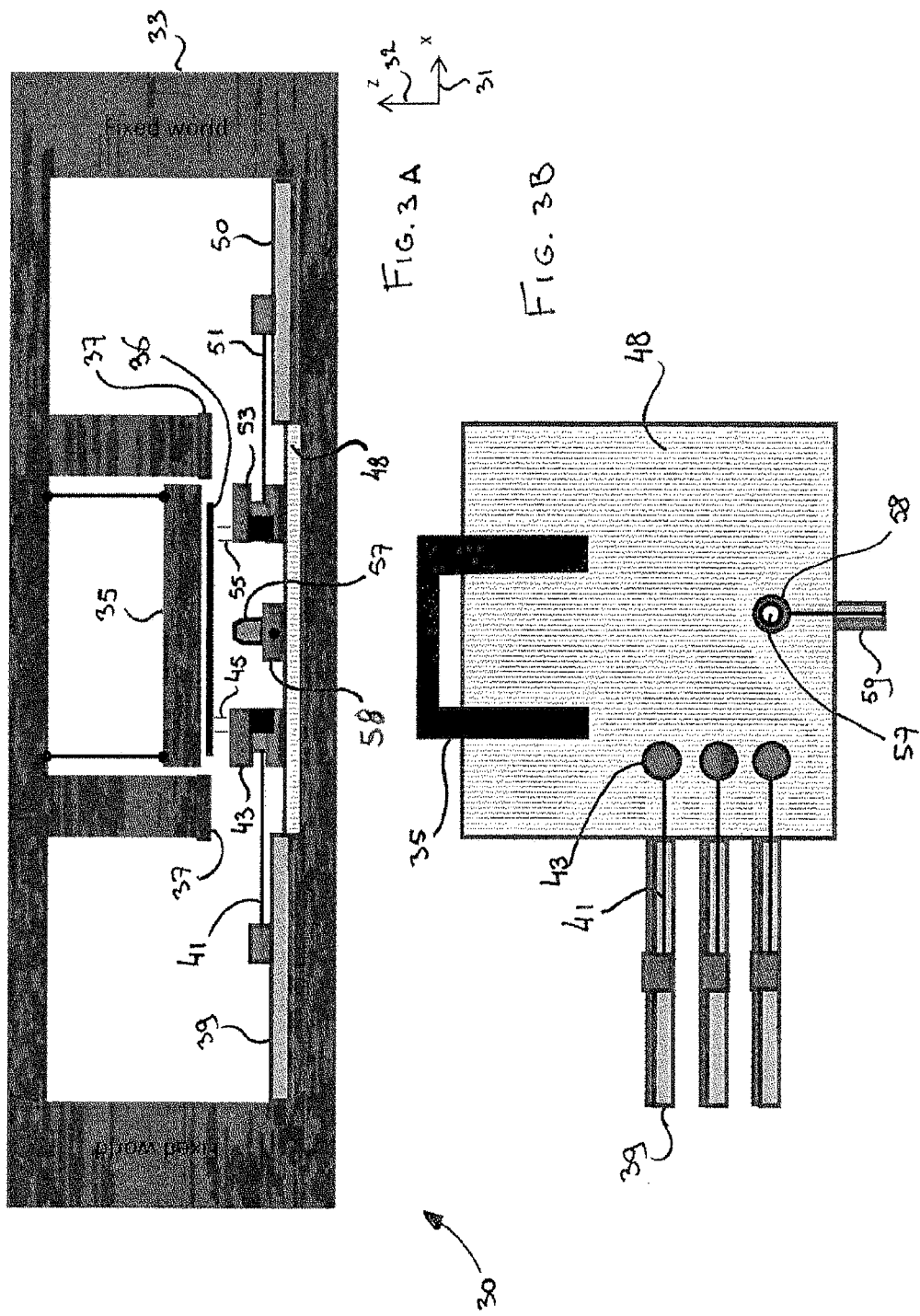

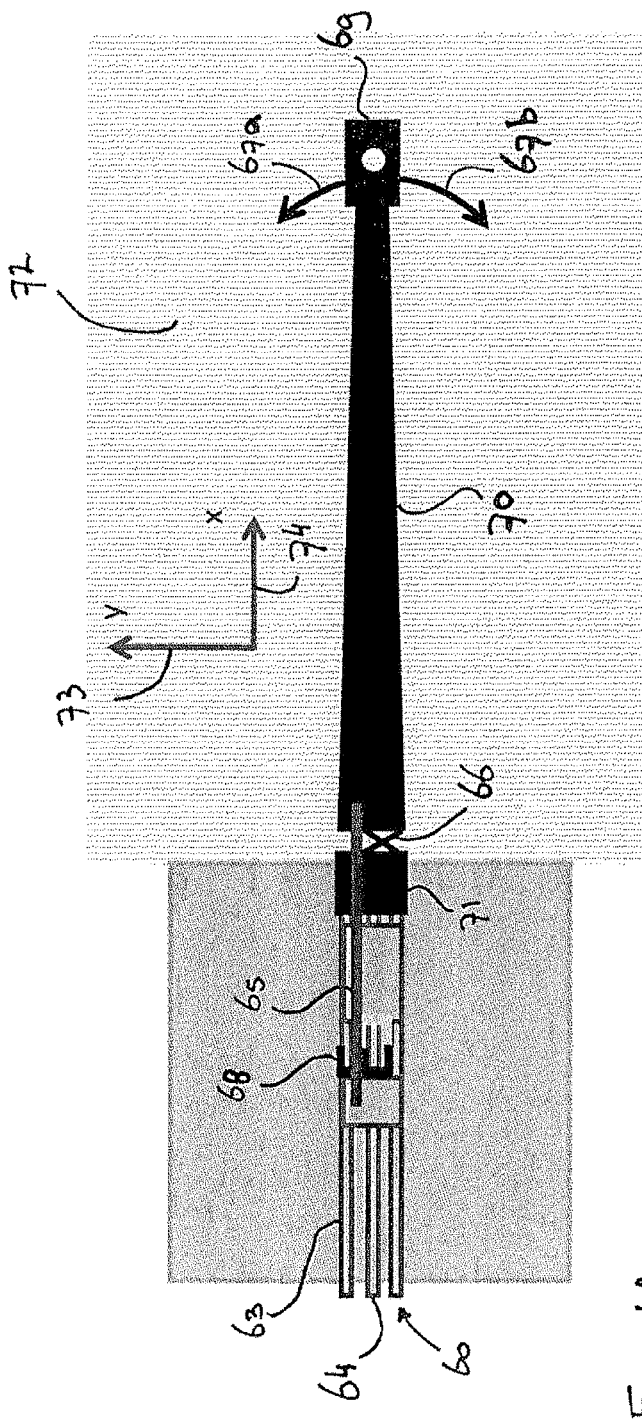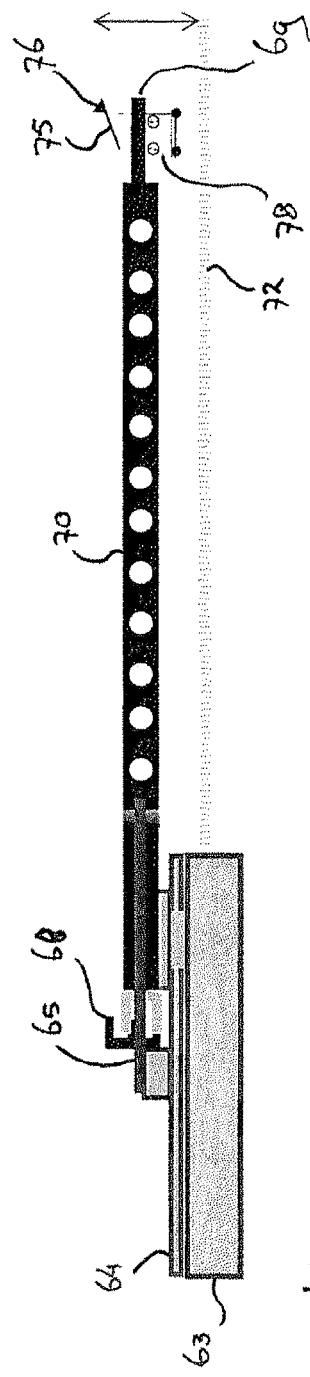
FIG. 4A
FIG. 4B

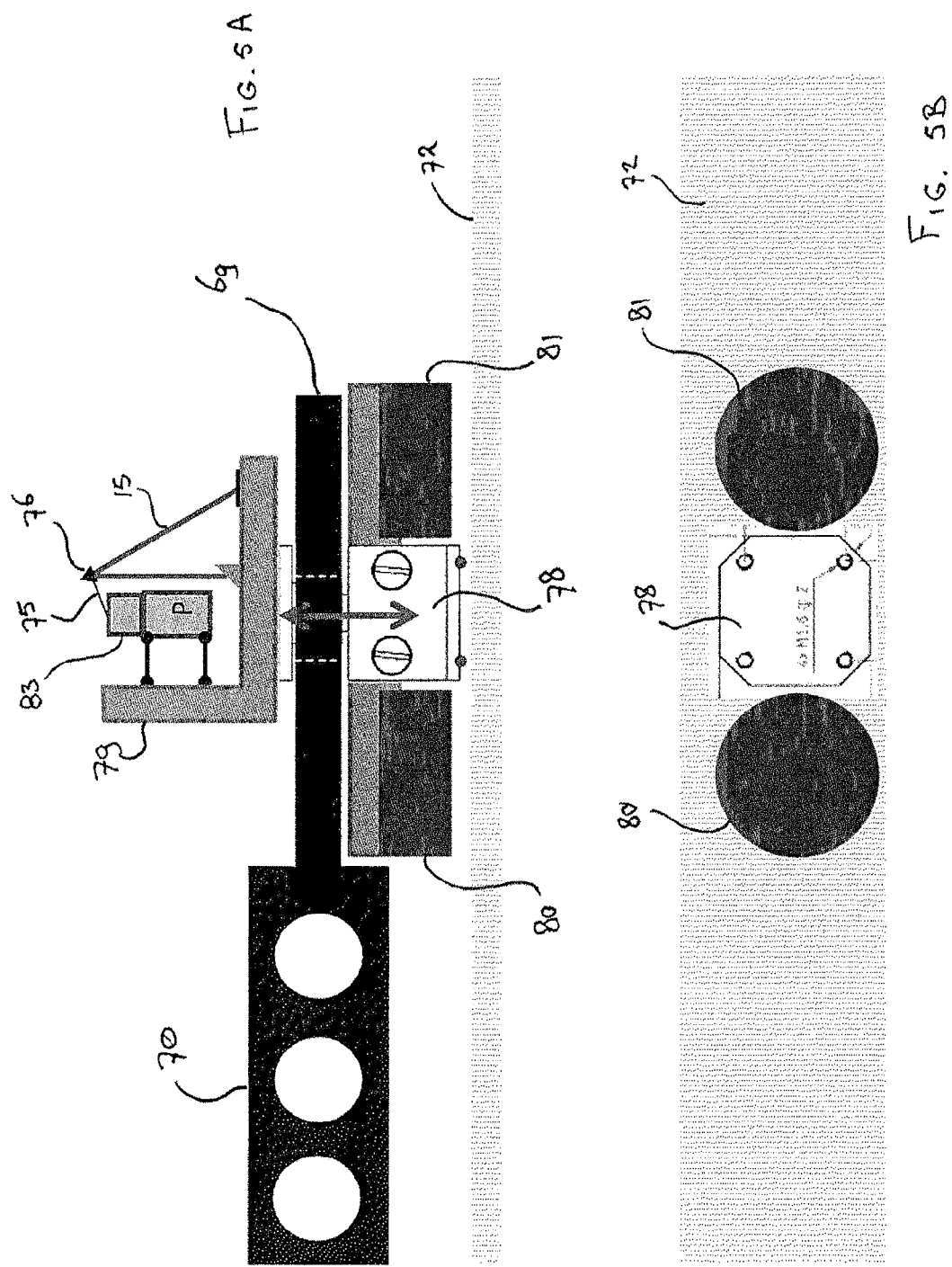

HIGH THROUGHPUT MICROSCOPY DEVICE

CROSS-REFERENCE TO RELATED APPLICATIONS

This application is a U.S. National Stage application under 35 U.S.C. §371 of International Application PCT/NL2013/050459 (published as WO 2014/003557 A1), filed Jun. 27, 2013, which claims priority to Application EP 12174204.3, filed Jun. 28, 2012 and EP 12175445.1, filed Jul. 6, 2012. Benefit of the filing date of each of these prior applications is hereby claimed. Each of these prior applications is hereby incorporated by reference in its entirety.

FIELD OF THE INVENTION

The invention relates to a device with a microscopic probe for measuring and/or modifying surface features of an object and a method of measuring and/or modifying surface features.

BACKGROUND

A scanning probe microscopy device serves to map nanostructures on a sample surface of a sample. Such a device may comprises a probe for scanning the surface of an object, and one or more motion actuators for enabling motion of the probe relative to the sample In one embodiment a probes comprises a probing tip mounted on a cantilever arranged for bringing the probing tip in contact with the sampling surface for enabling the scanning, and a Z-position detector for determining a position of the probing tip along a Z-direction when the probing tip is in contact with the sample surface (herein the Z-direction is a direction transverse to the sample surface).

Scanning probe microscopy (SPM) devices, such as atomic force microscopy (AFM) devices as described above are for example applied in the semiconductor industry for scanning of semiconductor topologies on a surface. Other uses of this technology are found in biomedical industry, nanotechnology, and scientific applications. In particular, measurements with a microscopic probe may be used for critical defect metrology (CD-metrology), particle scanning, stress- and roughness measurements. AFM microscopy allows visualization of surfaces at very high accuracy, enabling visualization of surface elements at sub-nanometer resolution.

The very high resolution and accuracy of a microscopic probe however comes at the cost of performance in terms of throughput. Throughput scales with the ratio of object area and the area of the smallest details that can be resolved with the microscopic probe. For object of macroscopic dimensions this results in significant processing time, which may be unrealistic or at least cumbersome for practical use and altogether incompatible with on line use in manufacturing processes.

Further development of the SPM technology has provided systems comprising a probe head upon which a plurality of probes are mounted side by side. Each probe comprises a cantilever and a probe tip, and each probe tips position in z-direction is measurable independently. This allows for scanning of a plurality of 'scanning lanes' at one pass of the scanning head, and as will be appreciated, the speed at which a single section may be scanned is multiplied by the number of probe tips present on the head.

WO2007121208 discloses scanning probe lithography, wherein a substrate is moved underneath a transparent reference flat with a grating pattern. The substrate contains a pattern that enable alignment with the grating pattern by interferometric spatial phase imaging. One or more probe tips are attached to the reference flat. Each probe tip can be moved up and down in a z-direction perpendicular to the reference flat. The z-positions that result from this movement are also measured by means of interferometric spatial phase imaging.

SUMMARY

Among others it is an object to provide for increased throughput speed when only selected positions on a surface must be measured and or processed.

A device for measuring and/or modifying surface features of an object is provided, the device comprising
a sample carrier having a surface for mounting the object;
a reference grid plate having a surface arranged in parallel with the surface of the sample carrier, at a distance from the surface of the sample carrier;
a plurality of heads that are movable along the reference grid plate, each head comprising a microscopic probe, the heads being located between the sample carrier and the reference grid plate, a sensor or sensors for sensing relative positions of the heads with respect to markings on the reference grid plate; the device comprising means for exerting a force between at least one of the heads and the reference grid plate and means for switching a value of said force to seat and/or clamp the at least one of the heads on the reference grid plate. The switching is used to switch between modes wherein a head is movable over the reference grid plate and a mode wherein the head is seated more stably on the reference grid plate. In an embodiment, the head is clamped against the reference grid plate. In an embodiment, each head comprises a respective one of the sensors.

BRIEF DESCRIPTION OF THE DRAWINGS

These and other aspects will be elucidated by description of some specific embodiments, making reference to the attached drawings. The detailed description provides examples of possible implementations, but is not to be regarded as describing the only embodiments falling under the scope. The scope of the invention is defined in the claims, and the description is to be regarded as illustrative without being restrictive on the invention. In the drawings:

FIG. 2 schematically illustrates the working principle of an atomic force microscope;
FIGS. 3A and 3B schematically illustrate an atomic force microscopy device;
FIGS. 4A and 4B schematically illustrate a support arm of an atomic force microscope;
FIGS. 5A and 5B schematically illustrate an enlarged view of a probe head in an atomic force microscope.

DETAILED DESCRIPTION

Figure 1:
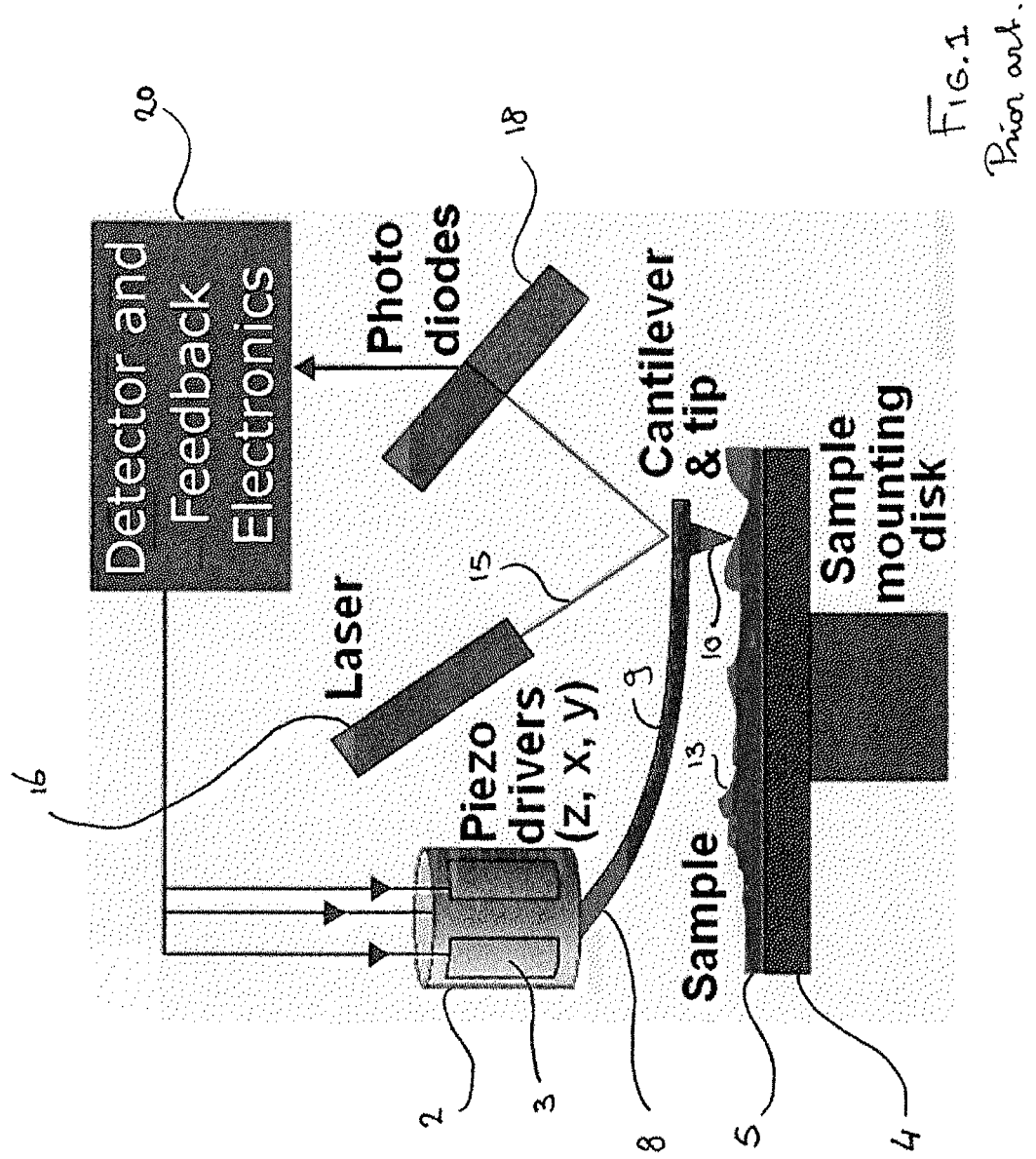
FIG. 1 schematically illustrates the working principle of a typical prior art atomic force microscope.

A scanning probe microscopy device serves to map nanostructures on a sample surface of a sample. The device comprises a plurality probes for scanning the sample surface, and one or more motion actuators for enabling motion of the probes relative to the sample, wherein each of said plurality of probes comprises a probing tip mounted on a cantilever arranged for bringing the probing tip in contact with the sampling surface for enabling the scanning, the device further comprising a plurality of Z-position detectors for determining a position of each probing tip along a Z-direction when the probing tip is in contact with the sample surface, wherein the Z-direction is a direction transverse to the sample surface, for enabling mapping of the nanostructures. Aspects of a scanning probe microscopy device may be found in co-pending European patent application No. 12174204, which is incorporated herein by way of reference.

Scanning probe microscopy (SPM) devices, such as atomic force microscopy (AFM) devices as described above are for example applied in the semiconductor industry for scanning of semiconductor topologies on a surface. Other uses of this technology are found in biomedical industry, nanotechnology, and scientific applications. In particular, AFM may be used for critical defect metrology (CD-metrology), particle scanning, stress- and roughness measurements. AFM microscopy allows visualization of surfaces at very high accuracy, enabling visualization of surface elements at sub-nanometer resolution.

The very high resolution and accuracy of this technology however comes at the cost of performance in terms of throughput. Atomic force microscopy is performed by tracing of a sample surface in a scanning motion using a probe tip touching or tapping (i.e. repeatedly touching) the surface, while accurately measuring disposition of the probe tip in a direction transverse to the sample surface (z-direction) using for example a high precision optical sensing system, e.g. using beam deflection or an interferometer. Scanning is performed by vibrating the tip in the z-direction, while performing the scanning motion across the surface to be mapped. To accurately map a given section of a sample surface, e.g. a structure on a wafer surface, the probe tip requires to be scanned such that every fraction of the section with sub-nanometer dimensions is touched or tapped by the probe tip at least once. As will be appreciated, this process may be rather slow.

Further development of the SPM technology has provided AFM systems comprising a probe head upon which a plurality of probes are mounted side by side. Each probe comprises a cantilever and a probe tip, and each probe tips position in z-direction is measurable independently. This allows for scanning of a plurality of 'scanning lanes' at one pass of the scanning head, and as will be appreciated, the speed at which a single section may be scanned is multiplied by the number of probe tips present on the head.

Even though the above has lead to an improvement in throughput, the scanning of multiple sites on a sample surface still takes a considerable amount of time. For this and other reasons, application of this technique in industrial environments, for example for the testing of wafers in semiconductor industry, is far from ideal.

It may be desirable to alleviate the abovementioned problems of the prior art, and to provide a scanning probe microscopy device that allows for high speed high throughput scanning of multiple sites on a sampling surface.

The above mentioned and other objects may be achieved by providing an scanning microscopy device for mapping nanostructures on a sample surface of a sample, comprising a plurality probes for scanning the sample surface, and one or more motion actuators for enabling motion of the probes relative to the sample, wherein each of said plurality of probes comprises a probing tip mounted on a cantilever arranged for bringing the probing tip in contact with the sampling surface for enabling the scanning, the device further comprising a plurality of Z-position detectors for determining a position of each probing tip along a Z-direction when the probing tip is in contact with the sample surface, wherein the Z-direction is a direction transverse to the sample surface, for enabling mapping of the nanostructures; wherein the plurality of probes are mounted on a plurality of heads, each head comprising one or more of said plurality of probes; wherein each of said heads is mounted on a support base associated with said head, each support base being arranged for individually moving its associated head relative to the sample; and wherein, for enabling said individual motion of the associated head, each support base comprises a plane actuator unit comprising at least one of said motion actuators for moving the head associated with the support base relative to the sample in at least one direction parallel to the sample surface, wherein the plane actuator unit is located at a first mounting position along said support base, said first mounting position being remote from a second mounting position, wherein the head associated with the support base is mounted on the second mounting position on the support base.

The scanning probe microscopy device may for example be an atomic force microscopy (AFM) device. Although in the present document reference will be made to particularly the embodiment of an atomic force microscopy device, the teachings of this document are not restricted to such an application, and may be applied to similar devices in the field of: BEEM, ballistic electron emission microscopy; CFM, chemical force microscopy; C-AFM, conductive atomic force microscopy; ECSTM electrochemical scanning tunneling microscope; EFM, electrostatic force microscopy; FluidFM, fluidic force microscope; FMM, force modulation microscopy; FOSPM, feature-oriented scanning probe microscopy; KPFM, kelvin probe force microscopy; MFM, magnetic force microscopy; MRFM, magnetic resonance force microscopy; NSOM, near-field scanning optical microscopy (or SNOM, scanning near-field optical microscopy); PFM, Piezoresponse Force Microscopy; PSTM, photon scanning tunneling microscopy; PTMS, photothermal microspectroscopy/microscopy; SCM, scanning capacitance microscopy; SECM, scanning electrochemical microscopy; SGM, scanning gate microscopy.

In accordance with most embodiments, the support bases comprising the probe heads will be embodied as support arms. With respect to such embodiments, the term 'support base' used in this document is to be interpreted as 'support arm'. As will be appreciated different type of support bases may be used.

A scanning probe microscopy device, such as an atomic force microscopy device, uses actuators for enabling motion of it's probing tips in three orthogonal directions relative the sampling surface. As already indicated, the tip must be movable in the z-direction which is usually implemented by applying a vibration to the probe tip in this direction. For scanning the surface, the probe tip is to be moved in two orthogonal directions parallel to the sampling surface.

In principle, the actuators for moving a head comprising the at least one probe tip parallel to the sampling surface, are located remotely from the mounting position of the head on the support base or support arm. The plane actuator unit for moving the head in-plane with respect to the sampling surface is placed at a distance away from the head, where there is more room available for accommodating the actuators. This released constraints on the head, and enables to provide the head being much smaller. As a result, the atomic force microscopy device can be equipped with multiple support bases or arms, each base carrying a head, and each head comprising one or more probes with probing tips. Each arm comprises its own plane actuator unit, allowing individual motion of each support base, independently from other bases.

As a result, the atomic force microscopy device allows for the simultaneous scanning of multiple remote sites on a single sampling surface, where each site may be scanned at the typical scanning speeds of a conventional microscope. The throughput is therefore multiplied by the number of support bases or support arms applied, which reduces the processing time considerably. For example, suppose that a convention AFM method requires 40 seconds for scanning a single site of 10 μm*10 μm. A wafer comprising 50 sites to be tested will take more than half an hour when it is tested using the conventional AFM method. Suppose the AFM method is applied in an AFM device with 50 individually movable and controllable support bases or arms, this wafer may be tested in only 40 seconds. As will be appreciated, the amount of support bases or arms provided is only limited by the design of the device, and is not restricted to the specific example of 50 bases or arms. A device with 30 bases or arms would require 80 seconds for scanning all sites: the first 30 sites in the first pass, and the remaining 20 sites in a second pass.

In a specific embodiment, the first mounting position is located near a first end of the support arm, and wherein the second mounting position is located near a second end of the support arm. In this embodiment, the actuators may be placed aligned with the axial direction through the support arm, in the extended direction thereof. Most flexibility in the design is achieved in this manner, and it further allows more support arms to be placed adjacent each other (due to absence of actuators and control parts to the side of the support arms), thereby increasing throughput.

Although in principle, any two orthogonal directions according to any coordinate system may be used, for one or more of said support bases or arms, the plane actuator unit of each of said one or more support arms comprises at least one of an X-direction motion actuator and a Y-direction motion actuator. Here the X- and Y-direction may be perpendicular directions parallel to the sampling surface corresponding to a Cartesian coordinate system.

In a particular embodiment, the X-direction actuator comprises a linear shift actuator for moving the second end along the X-direction. In another particular embodiment, the Y-direction actuator comprises a rotational actuator for pivoting the support base or arm such as to move the second end in the Y-direction. With respect to this latter embodiment, it is to be said that the pivoting action of the support bases or arms for providing the Y-directional motion avoids conflicts between support arms obstructing each other during scanning According to a particular embodiment, the rotational actuator comprises a hinge element for rotating the support arm in a plane parallel to the sample surface in use, said hinge element cooperating with a further linear shift actuator for providing the rotating action of the support arm. This allows for a very precise positioning of the probe tip relative to the sampling surface in the Y-direction. Moreover, to even increase precision, in accordance with a further embodiment, the hinge element comprises at least one element of a group comprising a cross hinge, a Haberland hinge, or a hinge comprising one or more leaf springs. Furthermore, again for allowing high precision positioning of the probe tip, in some embodiments the further linear shift actuator cooperating with the hinge element is arranged for acting on said support arm in a direction parallel to an axial direction through the arm and in an off-axis position thereof such as to enable pivoting of the arm by means of the hinge element.

In an embodiment of an atomic force microscopy device, each support base or arm may further comprises a Z-direction actuator for moving the probing tip in the Z-direction. The Z-direction actuator may comprise a Z-positioning actuator for bringing the probing tip to and from the sample surface, and/or a Z-vibration actuator for vibrating the probing tip in the Z-direction adjacent the sampling surface for enabling said scanning of said sample surface. According to some embodiments, the Z-direction actuator is located at the second mounting position of the support base or arm, mounted on or near the head. Mounting the Z-direction actuator on the head allows for the very precise and accurate stroke required in this direction.

Embodiments of the atomic force microscopy device may further comprise a motion control locator unit arranged for determining in use a current position of each of the heads relative to the sample surface in at least a direction parallel to the sample surface. As will be appreciated, the motion control locator allows for controlling motion of the support bases or arms by providing precise information on the location of each head and associated arm. This may be implemented in that the motion control locator unit comprises a grid formed by an arrangement of optical references, and wherein each head comprises an optical sensor for detecting the optical references, wherein said grid is arranged substantially parallel to the sample surface at an opposite position of the support bases or arms relative to the sample surface, such that the support bases or arms are in between the sensor grid and the sample surface in use. The references may comprise optically contrasting regions, e.g. reflective regions and absorptive regions. In another embodiment the grid is provided on or in a transparent plate, and one or more cameras are used, with the grid plate between the one or more cameras and the heads. In this case, the heads do not need to have their own sensors. Instead, images from the camera or cameras may be captured that show the grid and the heads through the grid plate. In this embodiment features of the grid and the heads may be detected in the images from the camera or cameras and their detected positions in the images may be used to determine the locations of the heads.

In conventional AFM methods, the location of the head (i.e. X-Y-position) is measured from the side of the sampling surface with optical sensors. An optical path from the side to some of the heads may become obstructed by other arms and heads. Therefore, a new type of locator unit has been developed for use in some embodiments where the above problem of obstructed view may play no part. The location is measured using a grid at an opposite side of the arm and head with respect to the sampling surface in use.

As will be appreciated, an atomic force microscopy device may further comprise a sample carrier arranged for receiving said sample in use, such as a wafer. Moreover, in accordance with some particular embodiments, relative to a gravitational direction, the heads are located above the optical reference grid, and the sample carrier is located above the heads, wherein the sample carrier is arranged for exposing the sample surface at a side facing the heads. This is a very convenient arrangement of functional layers in the device, as having the sample carrier on top allows for easy access to the sample carrier such as to replace the sample efficiently. At the same time, having the optical reference grid directly underneath the arms, opposite to the sample surface allows for accurate determination of the location of the heads and the probe tips at close distance. As a further improvement, the support base associated with each head can be locked with high stiffness to the grid, thus providing a stable reference for the topography measurement. The term actuator used throughout this document may include any high precision actuator available and known to the skilled person, including piezo-electric actuators, stepper motors, and the like.

According to a further embodiment, the plane actuation unit associated with each support base is mounted directly on the support base, providing actuation forces between the support base and a support structure below the support base. As will be appreciated, the above is a mechanical reversion of the earlier embodiments, falling within the scope of the claims.

The scanning probe microscopy device may for example be an atomic force microscopy (AFM) device. Although in the description below reference will be made to particularly the embodiment of an atomic force microscopy device, the teachings of this document are not restricted to such an application. As will be appreciated the teachings may be applied to any microscopy device that is based on the principles of scanning a surface region using a probe. Particular fields of applications have been mentioned earlier in this document.

FIG. 1 schematically illustrates the working principle of a typical prior art atomic force microscope. In FIG. 1, a probe head 2 comprises piezo type drivers 3 for the X-, Y-, and Z-directional motion of a probe 8. The probe 8 consists of a cantilever 9 having a probe tip 10 arranged for scanning a sample surface 5. During scanning, a dither piezo (not shown) may drive the cantilever in vibrational mode, for example close to resonant frequency, to enable tapping of the probe tip on the surface. The manner of applying a vibrational motion to the probe tip is known to the skilled person.

Scanning of the sample surface 5 is performed by moving the probe tip 10 in the X- and Y direction parallel to the sample surface 5 (or alternatively, by moving the substrate surface while maintaining the position of the probe tip fixed in the X- and Y-directions). The probe tip 10 is brought in close proximity to the surface 5 by means of a z-directional piezo driver. Once in the position, the probe tip 10 is vibrated in the z-direction such that it repeatedly touches the surface 5 during scanning thereof. At the same time, a laser 16 illuminates the probe tip with laser beam 15. The precise position in the z-direction is determined using photo diodes 18 which receive the reflected laser beam 15.

The sample surface 5 is carried using a sample carrier 4. Driving of the piezo drivers 3 located on the probe head 2 is performed using the detector and feedback electronics 20. At the same time, the detector and feedback electronics 20 receive the detected z position as determined using photo diodes 18. This principle allows for very precise mapping of surface elements, such as surface element 13 on the sample surface. As described herein above, since the mapping of the surface has to be performed with great precision, the speed at which the method is performed is rather slow.

FIG. 2 schematically illustrates an atomic force microscope device. FIG. 2 in particular illustrates the working principle of the AFM microscope. In particular, AFM microscope comprises a plurality of support arms 23, each of the support arms 23 carrying a probe head 25. The support arms 23 can be moved individually and independently from each other such that a plurality of sites 27 on the surface of the wafer 20 can be scanned by the plurality of arms 23 simultaneously. Although the AFM microscope illustrated in FIG. 2 only comprises 10 arms, it may be appreciated that the number of arms is only limited by the design of the AFM microscope. The microscope may easily comprise 20, 30, 40, 50, 60, 70 or more arms dependent on the size of the apparatus and the specific implementation in the AFM microscope according to the embodiments.

FIG. 3a is a schematic illustration of an atomic force microscope device in cross section is provided. In FIG. 3a only two of the fifty arms in this embodiment are illustrated. In FIG. 3a, a fixed frame 33 comprises a sample carrier 35 (also called chuck) from which there is suspended a wafer 36 forming the sample surface to be scanned using the AFM microscope. The elements 37 on either side of the sample carrier 35 provide for calibration of the arrangement, and for replacement of probe tips mounted on the respective probe heads 43 and 53 during the process. The AFM microscope 30 illustrated in FIG. 3a comprises two support arms 41 and 51. Each support arm (41, 51) is mounted on a linear shift actuator 39 and 50 respectively arranged for moving the arms 41 and 51 in the x-direction relative to the sampling surface on wafer 36. The x direction is indicated by arrow 31. The z direction is indicated by arrow 32 in FIG. 3a. Schematically illustrated in FIG. 3a are the probes 45 and 55 comprising the probe tips for scanning the surface of the wafer 36. Also schematically illustrated in FIG. 3a is vision element 58 comprising an imaging unit 57 for visual inspection of the wafer 36 by an operator.

FIG. 3b illustrates schematically a top view of the optical reference grid 48 including part of the support arms (e.g. arm 41). Visible in FIG. 3b are the imaging unit 57 placed on the vision element 58. As illustrated a linear shift actuator 59 allows for moving the imaging unit 57 around underneath the wafer 36.

FIG. 4a is s schematic illustration of a support arm 70 carrying a probe head 67 in an atomic force microscope device. The support arm 70 is moved in the x direction 74 by means of linear shift actuator 60. The linear shift actuator 60 consists of two glider rails 63 and a moving element 64 that can be moved in the direction of the glider rails 63.

In addition thereto, the support arm 70 is further connected to a further linear shift actuator 65 which is moved back and forth by means of element 68. The further linear shift actuator 65 cooperates with hinge element 66 such as to provide a rotational motion schematically indicated by arrows 67a and 67b in FIG. 4a. This enables to move probe head 69 of the support arm 70 in the y direction 73 such as to reach any site on the sample surface (not shown in FIG. 4a).

The hinge element 66 may be an elastic hinge, such as a cross hinge or a Haberland hinge. The specific position of the probe head 69 (in particular the probe tip (not shown)) can be monitored using the optical reference grid 72 underneath the probe head 69. A side view of the schematic illustration of FIG. 4a is provided in FIG. 4b. This illustrates the rails 63 upon which the linear shift actuator 64 moves the support arm 70 back and forth in the x-direction. On the head 69, the z-direction actuator 78 is present. The z direction actuator 68 is operated for moving the probe tip 76 on the cantilever 75 of the probe upward and downward in the z direction such as to move it to and from the sample surface. The actuator 78 is further arranged for applying a vibration to the probe tip 76 in the z direction during scanning of the sample surface. This enables mapping of the sample surface in great detail.

FIG. 5a illustrates schematically an enlarged view of the head 69 on the end of the support arms 70 in an atomic force microscope device. The head 69 comprises the z-direction actuator 78. On the z-direction actuator 78, a carrier construction 79 comprises a further piezo element 83 for vibrating the cantilever 75 and the probe tip 76. Also illustrated is the laser 15 used for accurately monitoring the z-position of the probe tip 76 upon touching the surface of the sample.

Underneath the head 69 two encoder heads 80 and 81 cooperate with the optical reference grid 72 for accurately determining the position of the probe head 69. The probe head 69 rests on the optical reference grid plane 72 by means of an air bearing, i.e. by blowing air through small pinholes in the surface 72. FIG. 5b illustrates the foot print of probe head 69 on the surface 72. In FIG. 5b, encoder heads 80 and 81 and the z-direction actuator can be seen. The support bases and other components are located in a general fixed frame with sufficient mechanical and thermal stiffness.

As a summary of the preceding, a scanning probe microscopy device has been described for mapping nanostructures on a sample surface of a sample, comprising a plurality probes for scanning the sample surface, and one or more motion actuators for enabling motion of the probes relative to the sample, wherein each of said plurality of probes comprises a probing tip mounted on a cantilever arranged for bringing the probing tip in contact with the sampling surface for enabling the scanning, the device further comprising a plurality of Z-position detectors for determining a position of each probing tip along a Z-direction when the probing tip is in contact with the sample surface, wherein the Z-direction is a direction transverse to the sample surface, for enabling mapping of the nanostructures; wherein the plurality of probes are mounted on a plurality of heads, each head comprising one or more of said plurality of probes;

wherein each of said heads is mounted on a support base associated with said head, each support base being arranged for individually moving its associated head relative to the sample; and wherein, for enabling said individual motion of the associated head, each support base comprises a plane actuator unit comprising at least one of said motion actuators for moving the head associated with the support base relative to the sample in at least one direction parallel to the sample surface, wherein the plane actuator unit is located at a first mounting position along said support base, said first mounting position being remote from a second mounting position, wherein the head associated with the support base is mounted on the second mounting position on the support base.

In an embodiment, the scanning probe microscopy device in accordance with claim 1, wherein for one or more of said support bases, the plane actuator unit of each of said one or more support bases comprises at least one of an X-direction motion actuator and a Y-direction motion actuator.

In a further embodiment, the X-direction actuator comprises a linear shift actuator for moving the second end along the X-direction.

In an embodiment, the Y-direction actuator comprises a rotational actuator for pivoting the support base such as to move the second end in the Y-direction.

In an embodiment, the rotational actuator comprises a hinge element for rotating the support base in a plane parallel to the sample surface in use, said hinge element cooperating with a further linear shift actuator for providing the rotating action of the support base.

In an embodiment, the hinge element comprises at least one element of a group comprising a cross hinge, a Haberland hinge, or a hinge comprising one or more leaf springs.

In an embodiment, the further linear shift actuator is arranged for acting on said support base in a direction parallel to an axial direction through said base and in an off-axis position thereof such as to enable pivoting of the base by means of the hinge element.

In an embodiment, each support base further comprises a Z-direction actuator for moving the probing tip in the Z-direction, wherein the Z-direction actuator comprises at least one of a group comprising a Z-positioning actuator for bringing the probing tip to and from the sample surface, or a Z-vibration actuator for vibrating the probing tip in the Z-direction adjacent the sampling surface for enabling said scanning of said sample surface by means of tapping of the probe tip.

In an embodiment, the device further comprises a motion control locator unit arranged for determining in use a current position of each of the heads relative to the sample surface in at least a direction parallel to the sample surface.

In an embodiment, the motion control locator unit comprises a grid formed by an arrangement of optical references, and wherein each head comprises an optical sensor, wherein said grid is arranged substantially parallel to the sample surface.

In an embodiment, the device comprises a sample carrier arranged for receiving said sample in use.

In an embodiment, relative to a gravitational direction, the heads are located above the sensor grid, and the sample carrier is located above the heads, wherein the sample carrier is arranged for exposing the sample surface at a side facing the heads.

In an embodiment, the first mounting position is located near a first end of the support base, and wherein the second mounting position is located near a second end of the support base.

In an embodiment, the plane actuation unit associated with each support base is mounted directly on the support base, providing actuation forces between the support base and a support structure below the support base.

In an embodiment, the support base associated with each head can be locked with high stiffness to the grid, thus providing a stable reference for the topography measurement.

Figure 6:
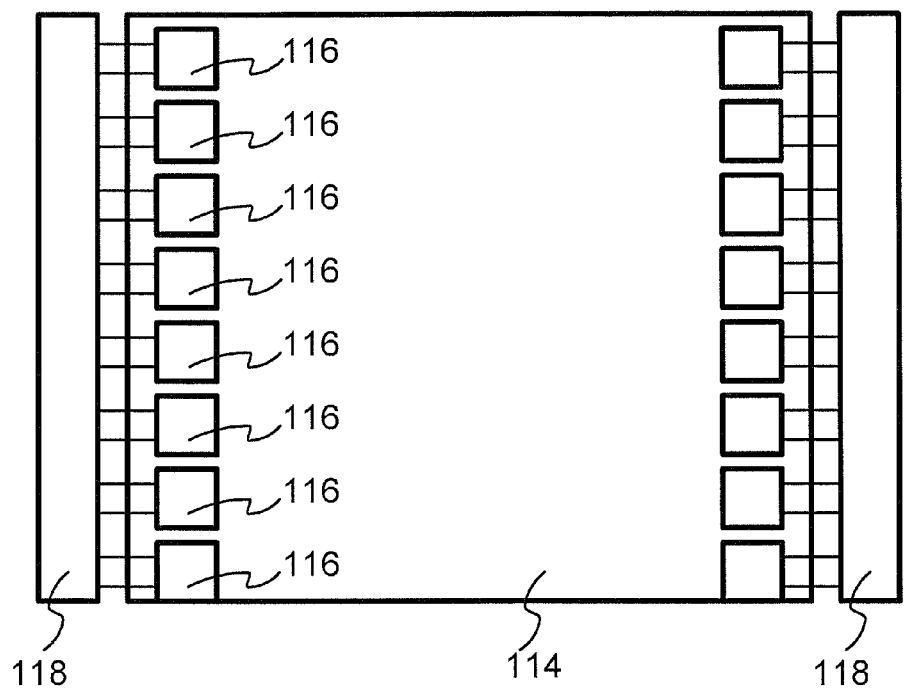
FIG. 6 shows a top view of a reference grid
Figure 8:
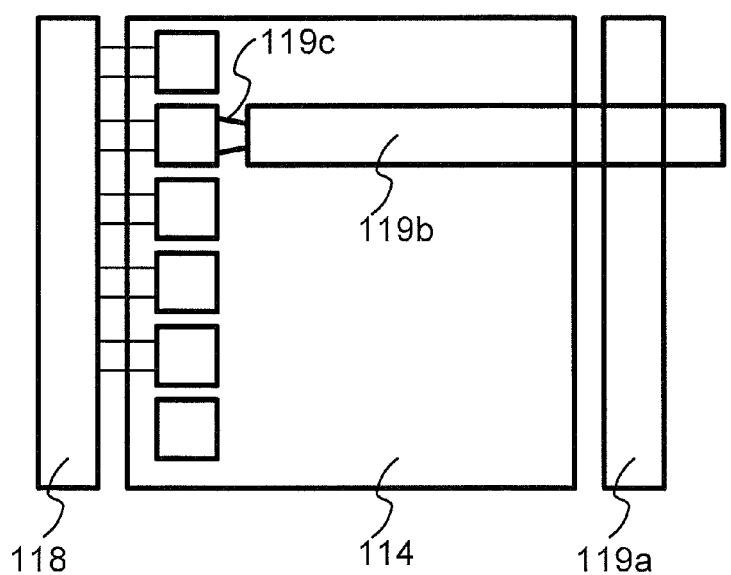
FIG. 8 shows a top view of a reference grid

FIG. 6 shows a top view of a reference grid 114. This may be an optical reference grid like that of FIG. 3b, but alternatively other types of detectable structures, such as magnets, magnetizable elements, electrically charged elements or electrically conductive elements such as conductor lines or capacitor plates or combinations thereof may be used on or in reference grid 114. Thus a capacitive or magnetic reference grid may be realized, which may be sensed by means of magnetic and/or capacitive sensors in the heads (here indicated by reference 116). Similarly a pattern of height or thickness variations in a reference grid plate may be used, in which case the heads 116 may use height or thickness sensors, e.g. tactile or ultrasonic.

The grid may be composed of sets of periodically repeated parallel lines of such elements, or islands in a periodic spatial lattice arrangement. But alternatively other arrangements may be used that allow for position determination such as circles and radial lines, spirals etc. Reference grid 114 may be provided in a reference grid plate made of glass, acryl, or plastic for example or in a laminate of fibers in a resin for example. Although a flat reference grid has been shown, it should be appreciated that a curved or undulating reference grid plate may be used, for example for the inspection of curved structures like lenses.

In the embodiment of FIG. 6 support units 118 are provided, which are coupled to each of the heads 116 by a flexible connection, including for example electrical conductor lines for delivery of electrical supply voltage and exchange electronic signals (e.g. digital or analog). Furthermore, the flexible connections may comprise flexible tubes for gas transport to and/or from heads 116. Flexible connections are used, optionally folded or spiraled, so as to allow for displacement of heads 116 with respect to support unit 118. A support unit 118 is has a plurality of flexible connections spatially arranged in a row for connection to different heads 116, so as to provide for a range of movement for the different heads without mutual interference. Alternatively, cables from a central point to the heads 116, or a cable may be used that branches to the heads 116. In the illustrated embodiment two support units are shown on opposite sides of reference grid 114. But it should be appreciated that alternatively support units on more sides, or on one side only may be used. Support units 118 may comprise electric circuits to supply and/or receive the voltages and signals and a gas supply and/or pump.

Figure 7:
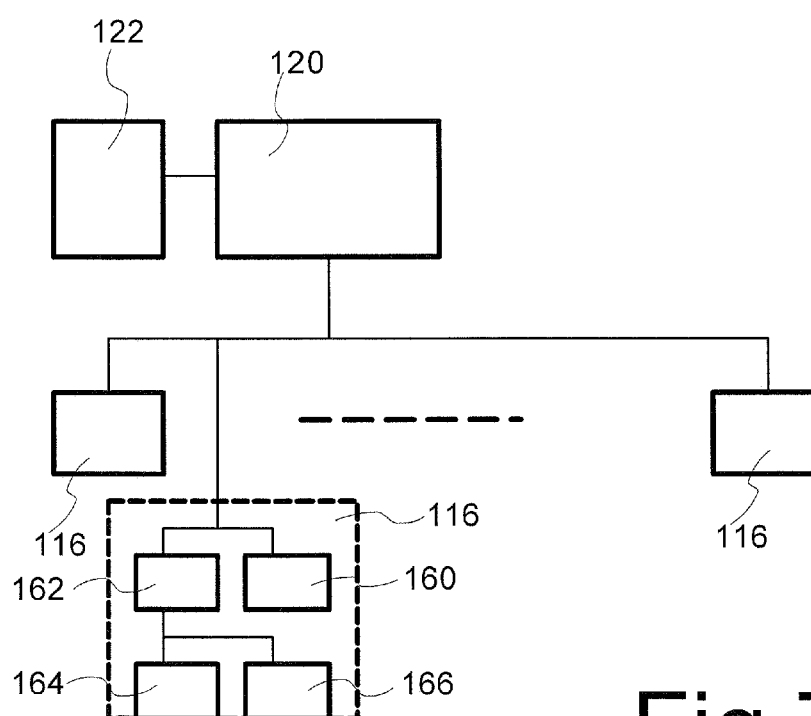
FIG. 7 shows a system diagram of the device

FIG. 7 shows a system diagram of the device. In the illustrated embodiment the system contains a computer 120 coupled to an initial inspection unit 122 and a plurality of heads 116. Computer 120 may in fact be a computer system containing a plurality of processors. Instead of, or as part of initial inspection unit 122 a memory may be used for storing information about locations to be inspected. One head 116 is shown in more detail, comprising an AFM 160, a position controller 162, an on board propulsion driver 164 and a position sensor 166.

Propulsion driver 164 may comprise one or more rotatable wheel for moving head 116 over reference grid plate. Alternatively, other driving mechanisms may be used, such as magnetic coils, or magnets which may form a linear motor structure with corresponding coils or magnets in or underneath the reference grid plate, piezo-steppers or ultrasonic piezo actuators. As another alternative gas jet propulsion may be used, using nozzles on the sides of the head 116 to drive out or draw in gas for propulsion purposes. In addition, nozzles may be provided in the base of head 116, to lift head 116 above the reference grid plate during movement.

Position sensor 166 provides for sensing of the reference grid. In the case of an optically readable grid, position sensor 166 may comprise a photo sensor and optionally a light source to detect structures in the grid as head 116 moves. In the case of a magnetically or capacitively readable grid head 116 may comprise capacitive and/or magnetic sensors. Position controller 162 may form a control loop with propulsion driver 164 and position sensor 166, wherein position controller 162 compares sensing results from position sensor 166 with data defining a target position or target path provided by computer 120, and position controller 162 controls propulsion driver 164 to move head 116 towards the target position and/or along the target path and/or or to control its orientation in a plane parallel to the reference grid plate.

In operation, when a specific wafer or other object is inspected, initial inspection unit 122 may be used to detect locations on that wafer or object that need to be inspected and/or modified. Initial inspection unit 122 may comprise a camera or image scanner for example, and initial inspection unit 122 may be configured to capture an image of the specific wafer. The initial inspection may be performed when the wafer is on the sample carrier, or before it is placed thereon. In the former case the sample carrier may be moved relative to the reference grid plate after the initial inspection, so as to allow for inspection without hindrance from the reference grid plate. Alternatively the initial inspection may be performed by means of a scanner (i.e. a line image sensor) that is moved between the sample carrier and the reference grid plate.

Computer 120 or initial inspection unit 122 may process this image to obtain a selection of locations. Alternatively, human visual inspection may be used to inspect the locations. The selected locations may be locations where more than a threshold deviation from average surface properties seen in the initial inspection is detected for example. Computer 120 assigns respective ones of the selected locations to respective heads 116, for example so that sequence of the positions of the connections to the heads from a support unit 118 corresponds to a sequence of projections of the locations on that support unit 118. Computer 120 then downloads the data defining the assigned locations and/or paths to those locations to the position controllers 162. Subsequently, position controllers 162 control movement of the heads 116 towards the selected locations. When a head 116 has reached its assigned location the AFM 160 performs measurements, which are communicated to computer 120 immediately or at the end of inspection.

Although an embodiment has been shown wherein position controllers 162 are included in heads 116, it should be appreciated that alternatively they may located outside heads 116, for example in computer 120 or support units 118. This decreases the weight of heads. However, use of a position controller 162 in a head 116 may improve operation of the control loop.

Although an embodiment has been shown wherein electrical signals and optionally gas supply are provided via flexible connections, it should be appreciated that alternatively wireless connections may be used. For example, heads 116 could be provided with Bluetooth transceivers and/or local pumps to create gas flow and/or a battery to supply power. Alternatively, power could be supplied inductively, or as RF energy. The function of gas flow to raise heads could be replaced by a magnetic levitation system. Other known wireless signal communication techniques may be used, e.g. by means of optical or ultrasound communication. When wireless connections are used, support unit 118 along a side of reference grid may be a docking station with detachable connections for connecting the heads to circuits and/or gas conduits in support unit 118. These connections may be used to charge batteries or other power sources in heads 116 and/or to charge a pressurized gas reservoir in heads 116 for use to supply gas to in gas bearings and/or propulsion. In another embodiment, the docking station may be used to download an indication of a selected position to the head and/or upload sensing data, making wireless communication unnecessary.

Although an embodiment has been shown wherein head 116 comprises an atomic force microscope 116, it should be appreciated that alternatively other microscopic probes may be used. Devices for surface inspection (including for example measuring elasticity of the surface) and/or surface modification may be used. As used herein these will also be referred to as microscopic probes devices: microscopic probes include devices for microscopic measurement of surface properties and/or modification of a surface. A microscopic probe may comprise a cantilever with a sensing tip, the cantilever being configured to allow the sensing tip to follow the surface. The may be a force sensor, an optical probe, comprising an optical objective lens and a photo sensor for example or a sensor for any other type of physical quantity. Usually, the microscopic probes will be part of a scanning probe microscope (SPM), a spatial position scanning mechanism being present in the SPM in a head 116.

A need for local measurement or surface modification may be determined on the basis of measurements by initial inspection unit 122. In an embodiment, different heads may comprise mutually different types of microscopic probes, In this embodiment, computer 120 may be configured to assign heads to locations also based on a selected type of inspection In another embodiment a head may comprise a plurality of different types of microscopic probes.

In an embodiment heads 116 are seated on the reference grid plate or clamped to the reference grid plate when the heads 116 reach their target position. Seating a head 116 means that a base of the head 116 is brought in contact with the reference grid plate. Measurement and/or modification of the surface of an object using a head is performed while the head 116 is seated or clamped to the reference grid surface. In this embodiment AFM 160 or other microscopic device in a head 116 comprises a position scanner, for scanning the position of its probe tip in at least one of the directions parallel to the reference grid plate relative to a base of head 116. A two dimensional XY scanner may be used, using piezo electric actuators for example. The base of head 116 is a surface of the head 116 that is in contact with the reference grid plate when the head is seated on or claimed to the reference grid plate.

Seating a head 116 on the reference grid plate may be realized in various ways. Preferably, the bottom surface of head 116 is clamped against the reference grid plate, so that stick slip forces will prevent movement of head 116 along the surface of reference grid plate due to lateral forces that not exceed a threshold of forces that normally arise in the device when the head is not propelled.

In an embodiment wherein the head uses a gas bearing (for example an air bearing) to lift the head above the reference grid plate during movement, seating may be realized by interrupting gas flow to the gas bearing. Clamping may be realized by switching from gas supply to the gas bearing gap between head 116 and reference grid plate to gas suction from that gap. In the embodiment with the means for exerting a force between the reference grid plate and head 116 comprise a system of conduits to supply and/or remove gas to and/or from the gas bearing. Switching means to switch this force may comprise valves and/or pumps coupled to the system of conduits to change the gas supply rate and/or rate of gas removal, and possibly electronics to control switching. The support unit 118 that is connected to the head 116 may comprise valves for interrupting gas flow to a head and/or switching to suction for this purpose. Computer 120 may be configured to control the support unit 118 to do so upon receiving a signal from the head indicating that the head has reached its target position. Although in one embodiment the force may be switched by changing gas flow in head 116, it should be appreciated that alternatively switching could be realized by changing gas flow through openings in the reference grid plate.

In other embodiments the means for exerting a force may comprise a magnet and/or electromagnet in head 116, and magnets and/or electromagnets may be provided in or below the reference grid plate, the magnets and/or electromagnets in at least one of the head 116 and in or below reference grid plate being an electromagnet. In this case the means for switching the force may comprise an electric switch and/or a switchable electronic current source circuit coupled to that electromagnet.

The magnets and/or electromagnets of head 116 and the reference grid plate may made attractive to clamp head 116 to the reference grid plate when head 116 is seated. This may be realized by switching a current through a coil in head 116 when the head must be seated, and/or by switching a current in a coil in or below the reference grid plate. In this embodiment, computer 120 may control the currents similarly to control of the valves in the gas bearing embodiment.

Seating has the advantage that a more stable platform is provided for the microscopic probe during surface inspection and/or surface modification. The force of gravity may suffice. But providing for attraction between the head and the reference grid plate increases stability. Clamping head against reference grid plate prevents accidental movements. Clamping by means of an electromagnet has the additional advantage that it is more readily compatible with propulsion of head 116 by one or more wheels. During movement of head 116 the electromagnets and magnets may be made repellent with a force that balances forces that attract head 116 to the reference grid is achieved that maintains the gap between head and grid.

The device may provide for seating and/or clamping the heads on the reference grid plate individually, independent of one another, for example by means of valves that each switch the gas transport of a respective one of the heads, or by switching the current in a coil in the head or selectively in a coil in or underneath the reference grid plate at the location of the head. This has the advantage that each head may be seated when it has achieved its target position. Alternatively, a plurality of heads may be seated simultaneously by opening or closing a common valve and/or switching currents. This simplifies the device. In another embodiment, gas is supplied to and/or removed from the gas bearings through openings in the reference grid plate. In this case, seating and/or clamping may be realized by changing gas flow through the openings. Optionally, this may be done locally, at part of the surface of reference grid plate.

Seating may also be used for heads that have their own propulsion driver. This has the advantage that the propulsion driver does not need to stabilize the position of the head during surface inspection and/or surface modification. However, seating may be used also in embodiments wherein the head is moved into position by external actuators.

In an embodiment, a pick and place manipulator (robot) may be used to position a plurality of heads, by gripping the heads one by one and placing them at their respective target locations. FIG. 7 shows an example of such a robot. The robot may comprise a first and second linear motor 119a,b and a gripper 119c. First linear motor 119a may be located along a side of reference grid 114. Second linear motor 119b may be located on first linear motor 119a, to move an arm of second linear motor 119b to selectable ones of heads 116. Gripper 119c may be located at the end of the arm. Gripper 119c may be specifically adapted to grip structures on heads 116. Instead a robot may be used that has a plurality of successive arms parts that rotate relative to each other at hinges.

Although an embodiment has been shown wherein the sample carrier (e.g. a wafer stage) is located above the reference grid, so that the force of gravity will pull the heads towards the reference grid, it should be noted that this is not strictly necessary. When means are provided to exert a force on the heads towards the reference grid any orientation may be used. Connecting arms or magnets and/or electromagnets may be used to exert such a force for example. But use of gravity simplifies the design.

The preceding description uses some specific embodiments. It will be appreciated that the embodiments shown in the drawings and described here and above are intended for illustrative purposes only, and are not by any manner or means intended to be restrictive. The content of the invention discussed here is merely restricted by the scope of the appended claims.

The invention claimed is:

1. A device for performing at least one of measuring and modifying surface features of an object, the device comprising
    a sample carrier having a surface for mounting the object;
    a reference grid plate having a surface arranged in parallel with the surface of the sample carrier, at a distance from the surface of the sample carrier;
    a plurality of heads that are independently movable by translation along the reference grid plate between different positions on the reference grid plate, each head comprising a base and a microscopic probe, the heads being located between the sample carrier and the reference grid plate; and
    a sensor or sensors for sensing positions of the heads along the reference grid plate relative to markings on the reference grid plate; the device comprising means for exerting a force between at least one of the heads and the reference grid plate and means for switching a value of said force to seat the base of the at least one of the heads on the reference grid plate at the different positions on the grid plate, thereby suppressing movability of the base along the reference grid plate.

2. The device according to claim 1, wherein means for exerting the force are configured to seat the base of the at least one of the heads to the reference grid plate in a first mode, whereby movability of the base along the reference grid is suppressed, and to provide a force value that allows for movement of the base of the at least one of the heads along the surface of the reference grid plate in a second mode, the means for switching being configured to switch the means for exerting the force between the first and second mode.

3. The device according to claim 1, wherein the at least one of the heads comprises a scanning mechanism for spatially scanning a position of a probe tip of the microscopic probe relative to the base of the at least one of the heads.

4. The device according to claim 3, wherein the means for switching comprises a valve to cause suction to be applied to space between the at least one of the heads and the reference grid plate.

5. The device according to claim 1, wherein the means for exerting a force comprise a gas supply system debauching into a space between the at least one of the heads and the reference grid plate whereby a gas bearing is formed the means for switching comprising a valve to reduce or reverse supply of the gas.

6. The device according to claim 1, wherein the means for exerting a force comprise electromagnets or an electromagnet and a magnet in the at least one of the heads.

7. The device according to claim 1, wherein the at least one of the heads comprises a propulsion unit for propelling the at least one of the heads over the reference grid plate, the propulsion unit comprising at least one of a magnet and a gas jet outlet in the at least one of the heads for generating a propelling force.

8. The device according to claim 1, comprising a pick and place manipulator configured to grip respective ones of the heads successively and move them to selected locations on the reference grid plate.

9. The device according to claim 1, wherein the microscopic probe is an atomic force microscope.

10. The device according to claim 1, comprising a support unit at a side of the reference grid plate, the support unit having a row of flexible connections coupled to respective ones of the heads, the flexible connections each comprising at least one of flexible electrical conductors and a flexible gas transport tube.

11. The device according to claim 1, wherein each head comprises a respective one of the sensors.

12. The device according to claim 1, wherein said suppressing movability results from said switching said value of said force to clamp the base of the at least one of the heads on the reference grid plate.

13. The device according to claim 12, wherein the at least one of the heads comprises a propulsion unit for propelling the as least one of the heads over the reference grid plate, the propulsion unit comprising at least one of a magnet and a gas jet outlet in the at least one of the heads for generating a propelling force.

14. The device according to claim 12, comprising a pick and place manipulator configured to grip respective ones of the heads successively and move them to selected locations on the reference grid plate.

15. A method of performing at least one of measuring and modifying surface features of an object mounted on a surface of a sample carrier, by means of a plurality of independently movable heads, each comprising a microscopic probe, the heads being located between the surface of a reference grid plate and the surface of the sample carrier, the method comprising
    moving a base of each head over the surface of the reference grid plate, to a head specific target location of the base on the reference plate selected for the head;
    determining positions of the heads along the reference grid plate during movement from markings on the reference grid plate sensed by sensor in the heads;
    switching a force between the heads and the reference grid plate to seat the base of each head on the reference grid plate, thereby suppressing movability of the base along the reference grid plate when the sensor has indicated that the head is at the target location selected for the head.

16. The method according to claim 15, comprising performing at least one of a scanning microscope measurement and an object surface modification from the head while the base of the head is seated on the reference grid plate.

17. The method of claim 16, wherein said at least one of a scanning microscope measurement and an object surface modification is performed while the base of the head is clamped on the reference grid plate.

18. The method according to claim 15, comprising performing an initial inspection of a surface of the object; selecting the target location based on the initial inspection.

19. The method according to claim 15, wherein said suppressing movability results from said switching said force to clamp the base of each head on the reference grid plate.

20. The method according to claim 15, wherein the heads comprise propulsion units for propelling the heads over the reference grid plate, the propulsion units comprising at least one of a magnet and a gas jet outlet in the heads for generating a propelling force.

* * * * *